May 30, 1939. O. J. HORGER 2,160,418
LUBRICATING SYSTEM FOR ROLLER BEARINGS
Filed April 29, 1937 3 Sheets-Sheet 1

May 30, 1939.  O. J. HORGER  2,160,418
LUBRICATING SYSTEM FOR ROLLER BEARINGS
Filed April 29, 1937   3 Sheets-Sheet 3

INVENTOR:
Oscar J. Horger
HIS ATTORNEYS.

Patented May 30, 1939

2,160,418

UNITED STATES PATENT OFFICE 2,160,418

LUBRICATING SYSTEM FOR ROLLER BEARINGS

Oscar J. Horger, Canton, Ohio, assignor to The Timken Roller Bearing Company, Canton, Ohio, a corporation of Ohio Application April 29, 1937, Serial No. 139,683

11 Claims. (Cl. 184—6)

In certain applications of roller bearings, the peripheral speed of the rollers may run as high as six to seven thousand feet per minute. In such cases, the ordinary system of lubricating the bearing is liable to fail due to the oil being flung off by the high centrifugal force and due also to the churning and frothing of the oil in the well into which the lower portion of the bearing extends. The principal object of the present invention is to obviate these difficulties and to effect constant and thorough oiling of the bearing even when running at extremely high speeds. The invention consists in a system whereby the oil is sprayed into the bearing at such a point and in such a direction as to maintain a fine mist throughout the bearing. It also consists in the parts and in the arrangements and combinations of parts hereinafter described and claimed.

Figure 1:
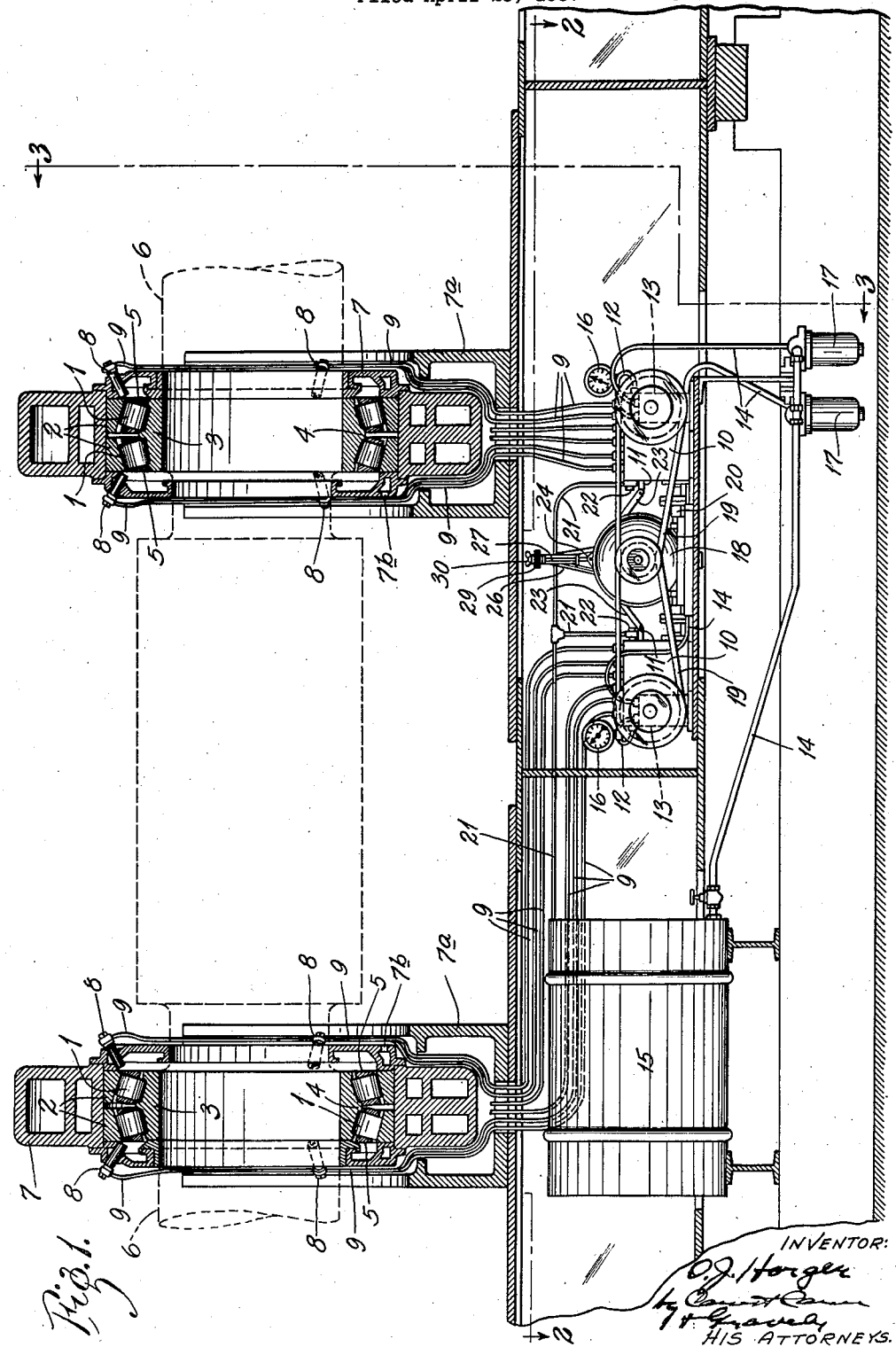
Figure 2:
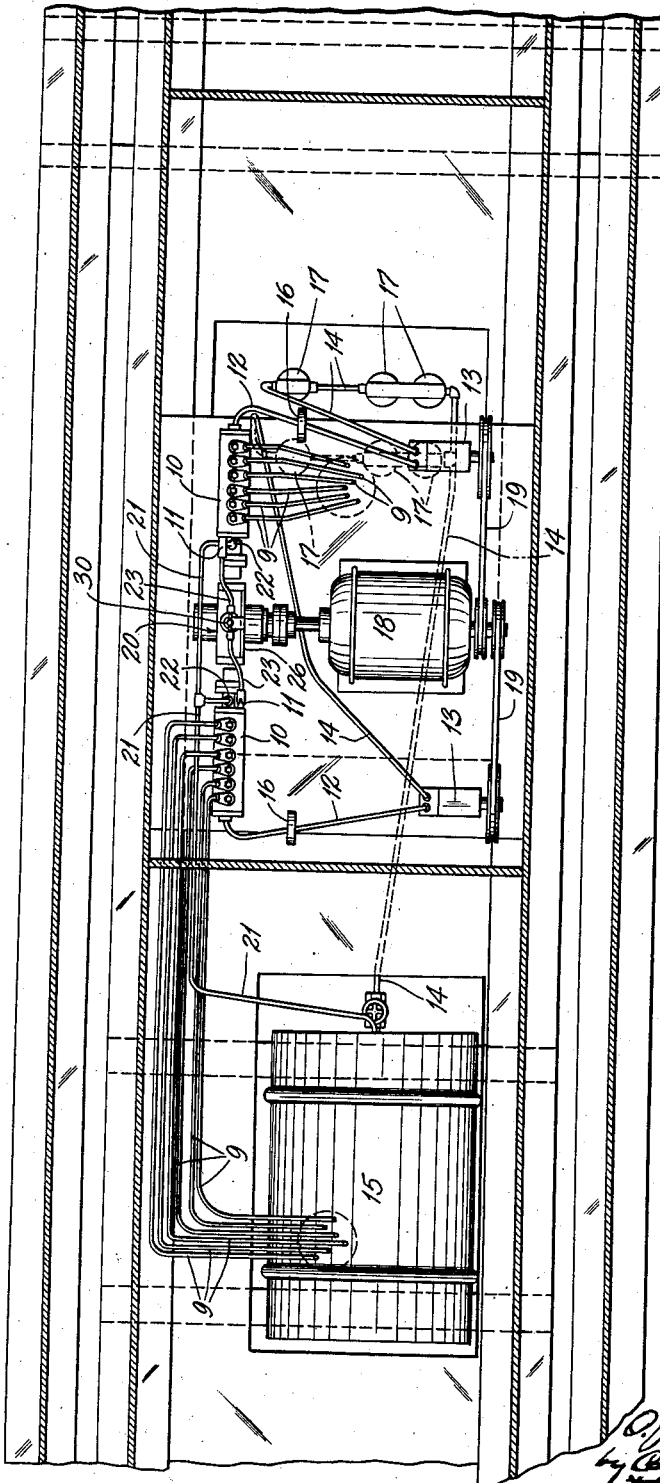
Figure 3:
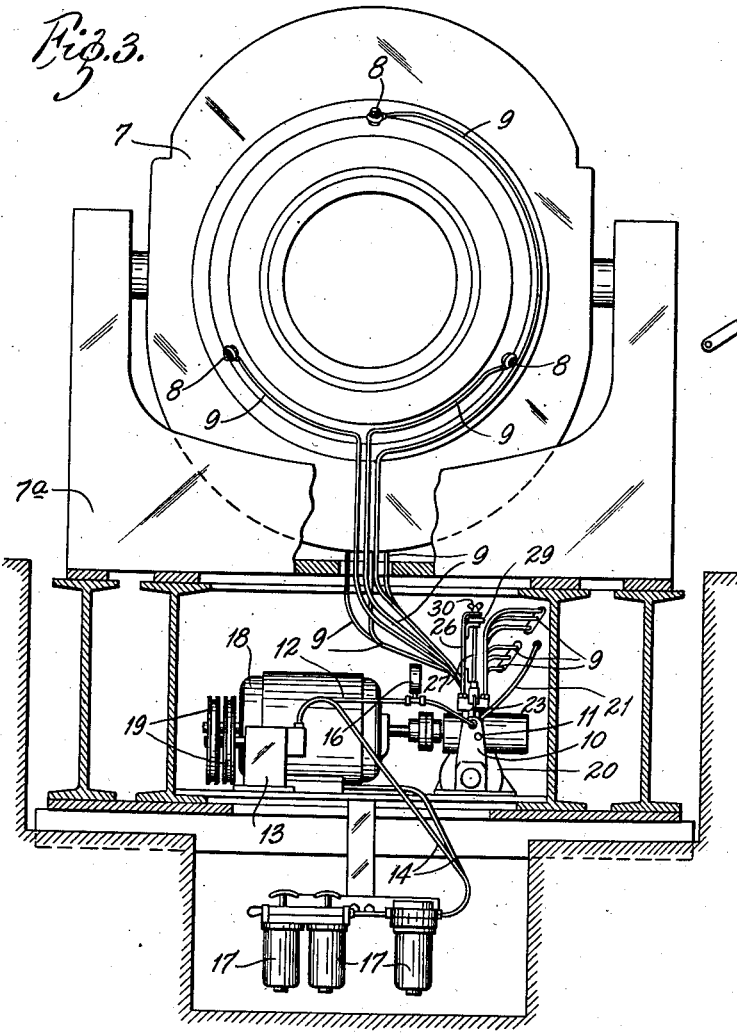
Figure 5:
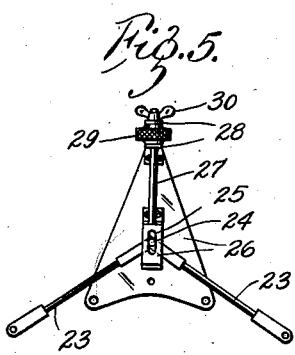
Figure 6:
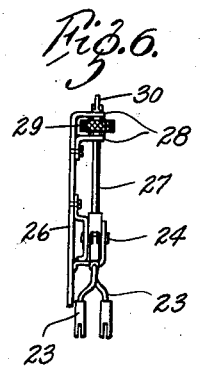
Figure 4:
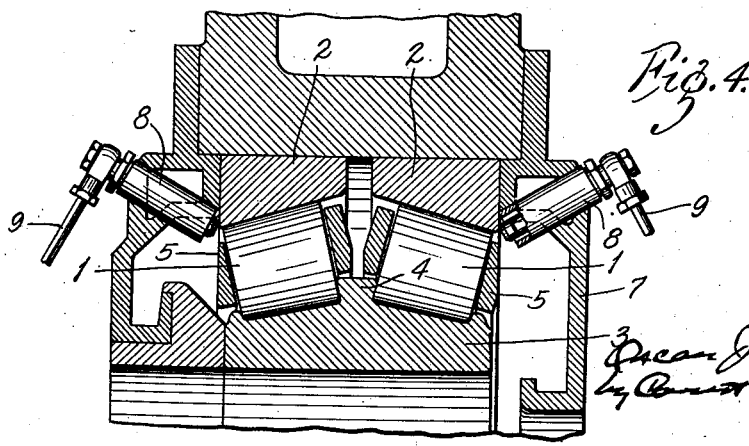

In the accompanying drawings, wherein like reference numerals refer to like parts wherever they occur, Fig. 1 is a view of my system as used in a machine for testing the large bearings, the view being partly in side elevation and partly in vertical section through one of the bearings, Fig. 2 is a horizontal section of the apparatus on the line 2—2 in Fig. 1, Fig. 3 is a vertical cross-section on the line 3—3 in Fig. 1, Fig. 4 is an enlarged radial sectional view of a portion showing the relation of the spray nozzle to the rollers and raceway members of the bearing; and Figs. 5 and 6 are detail views of the rig for operating the control racks of the Diesel pumps.

While my invention is applicable for lubricating bearings of various types, for the purpose of illustration I have shown a bearing which is of a well known type and comprises two rows of taper rollers 1 interposed between outer raceway members or cups 2 and inner raceway members or cones 3 mounted on a shaft. In the construction illustrated, the inner raceways for the two rows of rollers are formed on one integral member, which is made in the form of two cones arranged base to base with an annular thrust rib 4 between the two raceways, the shoulders or end faces of said rib serving to receive the end thrust of the rollers. The rollers are spaced apart by means of a suitable cage 5 consisting of annular end members suitably connected together, as by bridges between the rollers or by rods extending axially through the rollers. The cage ring at the small end of the rollers is of smaller diameter than the internal diameter of the cup at the small end of the raceway, thus leaving an annular space between the cage ring and the small end of the cup. The bearing supports a shaft 6 and is enclosed in a suitable housing 7 which is supported by a suitable base member 7a and has an outlet 7b about level with or below the lowermost rollers of the bearing.

One or more spray valves or nozzles 8 are mounted in the housing or support 7 near each row of rollers 1 in position to deliver oil to the bearing through the annular space between the cage ring and the small end of the bearing cup 2. In the construction illustrated, there are three nozzles for each row of rollers. Each nozzle 8 is preferably of the well known type used for spraying fuel into a Diesel engine, and no claim is made herein to any specific nozzle. The nozzle is set in such inclined position that its longitudinal axis extended will pass through the annular space between the cup and the cage ring close to the apex of the angle between the raceway surface and the surface of the thrust rib 4.

In the particular system illustrated in the accompanying drawings, there are two sets of bearings, each set comprising two rows of rollers, and each row of rollers having three nozzles. That is, six nozzles for each two-row bearing. As shown in the drawings, each of the six nozzles for such two-row bearing is connected through suitable pipes 9 to the corresponding pump element or cylinder of a separate six-cylinder high pressure pump 10 preferably of the well known Diesel type wherein the quantity of oil delivered to all of the cylinders is controlled by a single rack bar or rod 11, for feeding fuel to the Diesel engines. The respective Diesel pumps communicate through suitable pipes 12 with supply pumps 13 which communicate through pipes 14 with a supply tank 15 or other suitable source of liquid oil. The pipes 12 leading from the supply pumps 13 to the Diesel pumps 10 are provided with suitable pressure gages 16. Suitable filters 17 are located in the supply lines 14.

The Diesel pumps 10 and the supply pumps 13 are suitably connected to a motor 18 or other actuating means to be driven thereby, the supply pumps being adapted to deliver the oil to the respective Diesel pumps at a pressure in the neighborhood of twenty pounds per square inch and the Diesel pumps being adapted to deliver the oil to the respective nozzles at a higher pressure say about four hundred pounds per square inch. As shown in the drawings, belts 19 constitute the driving connections between the motor 18 and the two supply pumps 13, while a suitable speed reduction unit 20 constitutes the driving connection between the two Diesel pumps 10. A pipe line 21 provided with a suitable check valve 22 extends from each Diesel pump 10 to the supply tank 15 for delivering back to said tank any oil delivered by the Diesel pump in excess of that delivered through its nozzles.

The rack bars 11, which control the oil supply of the two Diesel pumps 10, are preferably simultaneously operated by a single manually operable device, shown in Fig. 5. This device comprises two links 23 pivotally connected at one end to the respective rack bars 11 and pivotally connected together at their other ends by a pin 24. The ends of this pin fit in slots 25 provided therefor in a bracket 26 which is secured to the housing of the speed reduction unit 20. The guide slots 25 are elongated and their axis bisects the angle between the links 23. The pin 24 is preferably secured to a third link or rod 27 in the plane of the axis of the elongated slots 25 and whose upper or outer end extends through vertical openings provided therefor in vertically spaced horizontal projecting flanges 28 on the bracket 26. This upper or outer end portion of the rod 27 is screwthreaded and is provided with a knurled nut 29 which fits between the two flanges 28, so that the turning of the nut shifts the rod and the pin 24 thereon upwardly and downwardly or inwardly and outwardly. The endmost portion of the rod 27 is provided with a thumb nut 30 which serves as a lock nut to hold the rod in adjusted position. By this arrangement, the turning of the knurled nut 29 feeds the link pin 24 of the toggle-like device and through its links 23 serve to actuate the respective rack bars 11 and thereby adjust the feed of all twelve of the Diesel pump cylinders simultaneously.

The operation of the system is as follows:

The oil from the supply tank 15 passes through the filters 17 and thence to the supply pumps 13 which deliver it at a relatively low pressure, say about twenty pounds, to the respective high pressure pumps 10 which deliver it to their respective delivery pipes 12 at a high pressure, say about four hundred pounds per square inch. From each delivery pipe 12, the oil passes to and through the nozzle 8 connected thereto. Any excess of oil beyond the capacity of the nozzle is by-passed through the check valve 22 back to the supply tank 15.

By reason of the type of nozzle and the high pressure of the Diesel pump, the oil is delivered from the nozzle in a very fine mist, which permeates the entire space within a bearing. By reason of the high pressure, the jet of oil spray is projected a considerable distance into the bearing; and due to the inclined position of the nozzle, the jet is directed diagonally towards the root or base of the thrust rib at the large end of the inner raceway. Thus, the surfaces of the rollers, raceways and thrust ribs are covered with a thin film of oil and, by reason of the fineness of the particles of oil, centrifugal force is relatively ineffective thereon and the entire surfaces of the rollers, raceways and thrust ribs remain coated with a fine film.

Heretofore it has been quite common to maintain a body of liquid oil in the lower portion of the housing at such a level that the lowermost rollers are flooded thereby. When the bearings are run at high speed, this practice results in churning the oil and in the formation of air bubbles therein and in covering the moving parts with such a thick coating of oil that the oil is readily flung off by centrifugal action and the purposes of oiling are defeated. With the present system, the oil level is lowered (by the lower location of the oil outlet 7b of the bearing housing 7) so that the oil level is below the rollers or reaches only the smaller ends of the rollers. Thus, there is no flooding of any portion of the bearing, churning is avoided, the effect of centrifugal force is minimized, and the full benefits of applying the oil in a fine mist are attained.

What I claim is:

1. A system of lubricating roller bearings which comprises a roller bearing, a housing therefor, a spray nozzle located and arranged to deliver lubricant in a fine mist between the bearing rollers, a pump in communication with said nozzle and capable of delivering lubricant to said nozzle under a pressure of the order of four hundred pounds per square inch and means for actuating said pump.

2. A system of lubricating roller bearings which comprises a taper roller bearing on a horizontal axis, a housing therefor, a spray nozzle located and arranged to deliver lubricant in a fine mist between the bearing rollers, a pump in communication with said nozzle and means for actuating said pump to deliver lubricant to said nozzle under pressure high enough for the nozzle to convert said lubricant into a fine mist.

3. A system of lubricating roller bearing which comprises a taper roller bearing, a housing therefor, a spray nozzle located and arranged to deliver lubricant in a fine mist between the bearing rollers, a pump in communication with said nozzle and means for actuating said pump to deliver lubricant to said nozzle under pressure high enough for the nozzle to convert said lubricant into a fine mist, said housing having a lubricant outlet low enough to keep the lubricant from flooding the moving parts.

4. A system of lubricating roller bearings which comprises a taper roller bearing on a horizontal axis, a housing therefor, a spray nozzle located and arranged to deliver lubricant in a fine mist between the bearing rollers, a pump in communication with said nozzle and means for actuating said pump to deliver lubricant to said nozzle under pressure high enough for the nozzle to convert said lubricant into a fine mist, said housing having a lubricant outlet low enough to keep the lubricant from flooding the lowermost rollers.

5. A system for lubricating a plurality of roller bearings which comprises housings for the respective bearings, spray nozzles for the respective bearings located and arranged to inject lubricant in a fine mist longitudinally between adjacent rollers of each bearing, pumps in communication with the spray nozzles for the respective bearings and capable of delivering lubricant to said nozzle under a pressure of the order of four hundred pounds per square inch, and a single means for actuating said pumps simultaneously to deliver lubricant to the nozzles supplied thereby under pressure high enough for the nozzles to convert said lubricant into a fine mist.

6. A system for lubricating a plurality of roller bearings which comprises a separate housing and a separate series of rollers for each bearing, a plurality of spray nozzles for each bearing located and arranged to inject lubricant in a fine mist longitudinally between adjacent bearing rollers of each series, separate pumps in communication with the spray nozzles for the respective bearings, a single means for actuating said pumps to deliver lubricant to the nozzles supplied thereby under pressure high enough for the nozzles to convert said lubricant in a fine mist, separate control means for each of said pumps, and a single means for actuating the control means of all of said pumps.

7. A system for lubricating a plurality of roller bearings comprising a separate housing and series of rollers for each bearing, separate sets of spray nozzles for each bearing located and arranged to inject lubricant in a fine mist longitudinally between adjacent rollers of the same series, separate pumps in communication with the set of spray nozzles for each bearing and capable of delivering lubricant to said nozzle under a pressure of the order of four hundred pounds per square inch, a single means for actuating all of said pumps to deliver lubricant to the set of nozzles supplied thereby under pressure high enough to convert said lubricant into a fine mist, a source of lubricant supply, pipes leading from said lubricant supply to the respective pumps, filters located in said pipes, and pipes leading from the respective pumps to said source of lubricant supply for delivering back to said source lubricant in excess of that delivered through said nozzles.

8. The combination, with a bearing of the type wherein taper rollers run between inner and outer conical raceway members and the inner bearing member has a thrust rib at the large end of its raceway, of a housing for said bearing, a series of spray nozzles mounted on the housing adjacent to the small diameter end of the outer raceway and inclining toward the base of said thrust rib at the large end of the inner raceway, and high pressure pumps in communication with the respective spray nozzles, the housing having a lubricant outlet low enough to keep the lower rollers from being flooded with lubricant.

9. The combination, with a bearing of the type wherein taper rollers run between inner and outer conical raceway members disposed on a horizontal axis and the inner raceway member has a thrust rib at the large end of its raceway, of a housing for said bearing, a spray nozzle mounted on the housing adjacent to the small diameter end of the outer raceway and inclining toward the base of the thrust rib at the large end of the inner raceway, and a high pressure pump in communication with said spray nozzle, the housing having a lubricant outlet low enough to keep the lower rollers from being flooded by oil accumulating in said housing.

10. The combination, with a bearing of the type wherein taper rollers run between inner and outer conical raceway members and the inner bearing member has a thrust rib at the large end of its raceway, of a housing for said bearing, a spray nozzle mounted on the housing adjacent to the small diameter end of the outer raceway and inclining toward the base of said thrust rib at the large end of the inner raceway, and a high pressure pump in communication with said spray nozzle, the housing having a lubricant outlet low enough to keep the moving parts from being flooded by accumulation of lubricant.

11. The combination with a roller bearing which comprises an outer conical raceway member, a conical inner raceway member having a thrust rib at the large end of its raceway, a series of taper rollers between said raceway members and a cage for said rollers separated from the small end of the outer raceway by an annular space, of a housing for said bearing, a spray nozzle close to the small diameter end of the outer raceway member in position to project oil through said annular space toward the base of said thrust rib, and means for forcing oil through said nozzle under pressure high enough to convert said oil into a fine mist.

OSCAR J. HORGER.